United States Patent Office 2,734,042
Patented Feb. 7, 1956

2,734,042

PROTECTIVE COATING COMPOSITION COMPRISING A POLYMER OF CHLOROPRENE AND AN ALKALINE EARTH METAL FLUORIDE

Allan J. Carter, Roy C. Hansen, and Charles M. Heinen, Detroit, Mich., assignors to the United States of America as represented by the United States Atomic Energy Commission No Drawing. Application November 13, 1944, Serial No. 563,296

5 Claims. (Cl. 260—30.6)

This invention relates to novel protective coating compositions and in particular it relates to the coating, impregnating, or close association of various fibers or fabrics with said protective coating materials which have been found to be particularly resistant to corrosive chemicals of either a solid, gaseous or liquid nature. The novel compounded compositions find utility particularly in the chemical fields wherein it is desirable to protect workers with garments made of fabrics which are resistant to corrosive gases such as fluorine gas and chlorine gas, radioactive materials such as $UF_6$, $UOF_4$, $RaCl_2$, corrosive acids such as hydrofluoric, hydrochloric, nitric, sulphuric or mixtures of one or more of these corrosive types of substances.

It is an object of the present invention to produce suitable fabrics for use in the manufacture of garments to be worn by chemical workers, gasket material, instrument covers, etc., said garments to be of excellent fire proof qualities and to be resistant to various corrosive chemicals with which such workers may come in contact. It is a further object of the invention to produce an improved coating composition which is substantially resistant to various corrosive chemicals of either liquid, gaseous or solid nature. It is a further object of the invention to produce fibers coated or in close association with a novel coating composition of synthetic rubber type base. More particularly, it is an object of the invention to produce glass fibers or fabrics made of glass fibers having coated thereon novel synthetic rubber coating compositions which have been found to possess improved protective qualities so far as resistance to corrosive chemicals is concerned. In particular, garments made of such fabrics are worn by chemical workers employed in cleaning and plating operations, in plants manufacturing gaseous fluorine or chlorine by electrolytic methods and plants dealing with radioactive materials of the type hereinbefore described. Other objects of the invention will be apparent to those skilled in the art upon a fuller understanding of the invention as more fully hereinafter described and detailed.

In order to accomplish the objects of the invention, novel synthetic rubber coating compositions are prepared in which the principal ingredient thereof is a synthetic rubber of the neoprene type. Coupled with the neoprene, various vulcanizing and curing agents, anti-oxidants, reinforcing pigments, fillers, softeners, plasticizers and the like may be incorporated after the manner customarily employed in the manufacture of natural rubber compositions as well as synthetic rubber compositions. The essential feature of the present invention resides in the introduction into the composition during compounding of substantial amounts of at least one alkaline earth metal fluoride such as calcium fluoride, barium fluoride, strontium fluoride and magnesium fluoride. As used in the accompanying specification and claims, the term "alkaline earth metal" is intended to include magnesium. When fluorine gas is contacted with a natural compounded rubber or with a synthetic rubber, neither of which contains any alkaline earth metal fluorides, the material catches fire almost immediately and offers very little, if any, protective features for those wearing garments coated with or impregnated with such materials. On the other hand, it has been discovered that neoprene compounded with at least one alkaline earth metal fluoride such as calcium fluoride or any other fluorine containing salt of the alkaline earth metal series affords good resistance to the corrosive action of fluorine gas as well as other corrosive chemicals.

Without any intention of limiting the invention by any theoretical considerations the following explanation is given. It is believed that the fluoride salt in addition to serving as a filler in the compounded rubber composition remains unaffected by fluorine gas for the reason that there is no anion for the fluorine to replace since the fluorine atom is common to the gas and a principal constituent of the compounded rubber. This is, in fact, the theory underlying the success of the invention, but it is not intended that the invention be limited thereby.

In order to satisfactorily produce the novel composition and use the same, it is only necessary that neoprene, which is a polymer of 2-chlor 1,3-butadiene, be compounded with a substantial portion of at least one alkaline earth metal fluoride in conjunction with the usual fillers, softeners, plasticizers, vulcanizing or curing agents, dispersion aids or the like commonly employed in compounded synthetic rubber manufacture. Particularly useful ingredients in the preparation of the novel compounded synthetic rubber masses are those which afford a certain amount of fire resistant qualities to the mass.

As vulcanization agents, or curing agents, the following compounds are useful:

Magnesium oxide
Zinc oxide
Lead oxide
Zinc butyrate
Zinc laurate of which the first two mentioned are preferred principally because of the fact that they not only serve as vulcanizing or curing agents, but in addition serve as acid acceptors for any liberated chlorine or hydrogen chloride evolved from the neoprene. Anti-oxidants or stabilizing agents may be employed. These are of the conventional aromatic amine type such as the aryl substituted naphthylamines (phenyl-beta-naphthylamine, phenyl-alpha-naphthylamine). Fillers employed may be selected from the following: Clay, whiting, barytes, asbestine, magnesium carbonate, and so forth, of which the latter is preferred. In addition, small percentages of plasticizers or softeners such as wax, fatty acids, oils, tars, tricresyl-phosphate and the like may be employed, of which the latter is preferred. In addition, an accelerator such as hexamethylene tetramine, 808, which is a butyraldehyde-aniline condensation product, 833, which is a butyraldehyde-monobutylamine condensation product, or one known under the trade name of Permalux which is di-ortho-tolylguanidine salt of dicatechol borate is employed advantageously in preparing the novel coating compositions. In compounding or preparing the coating composition, the usual methods of incorporating the various ingredients within the rubbery mass are employed. These involve milling or calendering, grinding and other well known methods employed in rubber compounding procedures.

Although the material may be milled into thin sheets and employed as such for protection against the heretofore mentioned corrosive chemical substances, for example as gloves for chemical workers, gasket materials, instrument covers, etc., it is preferred that a suitable fiber or fabric be employed as the base upon which the coating is deposited or placed. Suitable bases are asbestos fibers, glass fibers and other types of fibers known to possess fire-resistant or fire-retardant properties in and of themselves. The material may be milled or pressed onto the individual fibers but it is preferred that the novel synthetic rubber composition be suspended or extended in a suitable liquid vehicle so that the resultant liquid-rubber composition may be sprayed upon the fibers or woven fabrics or the said fibers or fabrics may be dipped or otherwise immersed in the liquid composition either in the fiber stage or in the fabric stage after weaving the fiber. If the coating operation takes place in the fiber stage, the fiber so coated may then be woven into fabric. The liquid vehicle selected for the liquid application of the coating composition should preferably be relatively volatile at atmospheric pressures and temperatures so that the coating is deposited on the fabric or fiber and readily freed from the liquid vehicle within a relatively short time. Suitable liquid extenders comprise the following: Benzene, toluene, xylene, $\beta,\beta'$ dichlor diethyl ether, chlorbenzene, carbon tetrachloride, ethyl acetate, butyl acetate, as well as other types of conventional organic vehicles. It is preferred to employ xylene or toluene though the particular organic liquid selected depends upon the specific drying conditions desired as well as the specific proportion and types of materials entering into the composition of the specific compounded rubber produced.

Still another method of coating or associating the base fibers or fabrics with the novel rubber composition involves the milling or calendering of a thin sheet or sheets of the synthetic rubber composition directly onto the fibers or onto the fibers and within the interstices of the fabrics. In the latter case, a thin sheet of composition may be placed on only one side of the fabric or a thin sheet may be placed on each side prior to milling or calendering. If the coated fabric is to be employed as a protective agent in connection with radioactive substances, a small amount of boron or a boron compound such as sodium borate, phenyl borate, etc., is preferably included in the mixture being calendered onto the fiber glass fabric.

A specific synthetic rubber coating composition is prepared as hereinafter set forth, the parts being by weight. It is not however, intended that the invention be limited or restricted to the following specific example since it is clearly apparent that various modifications both in the ingredients and methods of compounding may be employed without departing from the spirit of the present invention.

*Example.*—A synthetic rubber coating composition was prepared according to the following formula,

| | |
|---|---|
| Neoprene G N | 100 |
| Calcium fluoride | 32 |
| Magnesium carbonate | 68 |
| Zinc oxide | 4 |
| Magnesium oxide | 4 |
| Permalux | 1 |
| Tricresyl phosphate | 10 |

100 grams of this material was extended with 200 cc. of toluene and the same was spread on a fabric of fiberglass. Several test pieces of the fiberglass so coated were subjected to the following corrosive chemicals as outlined below with the following results.

| Corrosive Agent | Result |
|---|---|
| Fluorine Gas 95% | Withstood ¼ inch stream with 30 lbs. pressure behind it at 4 inch distance. |
| Hydrofluoric Acid (conc.) | Satisfactory in 1½ hours. |
| Sulfuric Acid (conc.) | Do. |
| Nitric Acid (conc.) | Do. |
| Hydrochloric Acid (conc.) | Do. |
| Aqua Regia | Do. |

It is intended to include within the scope of this invention all objects, variations and modifications common to the synthetic rubber composition art and it is not intended to limit the scope of the invention except as designated in the appended claims.

What is desired to be secured by Letters Patent is:

1. A synthetic rubber composition which is resistant to the action of gaseous fluorine and suitable for application to a fabric which comprises a polymer of 2-chlor 1:3 butadiene as the sole elastomer therein admixed with about 32 per cent of its weight of an alkaline earth metal fluoride.

2. A coated fabric which is resistant to the action of gaseous fluorine which comprises a fiberglass fabric coated with a synthetic rubber composition which comprises a polymer of 2-chlor 1:3 butadiene as the sole elastomer therein admixed with about 32 per cent of its weight of an alkaline earth metal fluoride.

3. A composition as defined in claim 1 in which the alkaline earth metal fluoride is calcium fluoride.

4. A synthetic rubber composition which is resistant to the action of gaseous fluorine and suitable for application to a fabric which consists by weight of 100 parts of a polymer of 2-chlor 1:3 butadiene, 32 parts of calcium fluoride, 68 parts of magnesium carbonate, 4 parts of zinc oxide, 4 parts of magnesium oxide, 1 part of the di-ortho-tolyl guanidine salt of dicatechol borate, and 10 parts of tricresyl phosphate.

5. A coated fabric which is resistant to the action of gaseous fluorine which comprises a fiberglass fabric that has been coated with the synthetic rubber composition which has been defined in claim 4.

References Cited in the file of this patent

UNITED STATES PATENTS

| | | |
|---|---|---|
| 2,167,313 | Röhr | July 25, 1939 |
| 2,209,928 | Nowak et al. | July 30, 1940 |
| 2,318,684 | Gaylor | May 11, 1943 |
| 2,335,321 | Szegvari | Nov. 3, 1943 |
| 2,373,461 | Crampton | Apr. 10, 1945 |
| 2,446,251 | Stricklin | Aug. 3, 1948 |

FOREIGN PATENTS

| | | |
|---|---|---|
| 490,877 | Great Britain | Aug. 23, 1938 |

OTHER REFERENCES

Du Pont: "The Neoprenes," Report No. 43–3, September 1942, by Fraser and Catton, Pub. by Rubber Chemicals Division of E. I. du Pont de Nemours and Co. (Inc.), Wilmington, Del., pages 10 and 13 (entire publication 24 pages).

Du Pont: "Neoprene Latex Type 57," Report No. 39–3, May 1939, by Dales and Ayscue, Pub. by Rubber Chemicals Division of E. I. du Pont de Nemours and Co., Inc., Wilmington, Del., pages 12 through 16 (entire publication 18 pages).

Hackh's Chemical Dictionary, 2nd Ed., Blakiston, 1937, articles "Neoprene" and "Duprene," pages 623 and 322, respectively.